United States Patent [19]
Polich et al.

[11] Patent Number: 5,469,463
[45] Date of Patent: Nov. 21, 1995

[54] EXPERT SYSTEM FOR IDENTIFYING LIKELY FAILURE POINTS IN A DIGITAL DATA PROCESSING SYSTEM

[75] Inventors: Herman Polich, Monument; James Nicholson; Larry Emlich, both of Colorado Springs, all of Colo.

[73] Assignee: Digital Equipment Corporation, Maynard, Mass.

[21] Appl. No.: 700,112

[22] Filed: May 8, 1991

Related U.S. Application Data

[63] Continuation of Ser. No. 175,485, Mar. 30, 1988, abandoned.

[51] Int. Cl.⁶ .............................. G06F 11/30; G06F 11/34
[52] U.S. Cl. ................. 395/182.18; 395/183.02
[58] Field of Search .................... 371/16.1, 29.1, 371/4, 5, 18, 10.1, 10.2, 15.1, 16.5, 21.6; 395/916, 575

[56] References Cited

U.S. PATENT DOCUMENTS

| | | | |
|---|---|---|---|
| 3,704,363 | 11/1972 | Salmassy et al. | 371/5.1 |
| 3,815,097 | 6/1974 | Gardner et al. | 364/200 |
| 3,928,830 | 12/1975 | Bellamy et al. | 371/4 |
| 4,108,360 | 8/1978 | Beismann et al. | 235/304 |
| 4,188,615 | 2/1980 | Tan | 371/4 |
| 4,242,751 | 12/1980 | Henckels et al. | 371/26 |
| 4,339,657 | 7/1982 | Larson et al. | 235/92 QC |
| 4,453,210 | 6/1984 | Suzuki et al. | 364/200 |
| 4,554,661 | 11/1985 | Bannister | 371/15 |
| 4,633,467 | 12/1986 | Abel et al. | 371/16 |
| 4,644,479 | 2/1987 | Kemper et al. | 364/550 |
| 4,710,924 | 12/1987 | Chum | 371/4 |
| 4,713,810 | 12/1987 | Chum | 371/4 |
| 4,740,887 | 4/1988 | Rutenberg | 364/184 |
| 4,754,409 | 6/1988 | Ashford et al. | 364/513 |
| 4,769,761 | 9/1988 | Downes et al. | 371/4 |
| 4,817,092 | 3/1989 | Denny | 371/11.3 |
| 4,841,456 | 6/1989 | Hogan, Jr. et al. | 364/550 |
| 4,847,795 | 7/1989 | Baker et al. | 364/579 |
| 4,866,712 | 9/1989 | Chao | 371/5.1 |
| 4,922,491 | 5/1990 | Coale | 371/16.1 |
| 4,932,028 | 6/1990 | Katirciogiu et al. | 371/16.5 |
| 5,090,014 | 2/1992 | Polich et al. | 371/15.1 |

FOREIGN PATENT DOCUMENTS

| | | | |
|---|---|---|---|
| 56-137455 | 10/1981 | Japan . | |
| 0109061 | 7/1982 | Japan | 371/4 |
| 63-59638 | 3/1988 | Japan . | |
| 8706371 | 10/1987 | WIPO . | |

OTHER PUBLICATIONS

*IBM Technical Disclosure Bulletin*, vol. 22, No. 2, Jul. 1979, Lutter et al., "Error Status Reporting", pp. 508–509.

*IBM Technical Disclosure Bulletin*, vol. 3, No. 12, May 1961, Stringfellow et al., "Maintenance Scanner", pp. 19–20.

*Computer & Communications Decisions*, vol. 19, No. 9, Jun. 1987, Moran, "Systems and Peripherals—Coming: Self–diagnosing disks", pp. 65–67.

*Electronics*, vol. 52, No. 23, Nov. 8, 1979, pp. 116–118, Frechette et al., "Support processor analyzes errors caught by latches".

*Computerworld*, vol. 21, No. 38, pp. 83–84, Sep. 21, 1987, Bozman, "DEC's service network grows".

(List continued on next page.)

*Primary Examiner*—David M. Huntley
*Attorney, Agent, or Firm*—Fish & Richardson

[57] ABSTRACT

An expert system for determining the likelihood of failure of a unit in a computer system. The operating system of the computer system maintains a log of the errors occurring for each unit in the computer system. If a predetermine number of errors have been entered in the log for a specific unit, the expert system retrieves the error entries relating to that unit and processes them to determine whether a failure is likely to occur. In this, the processing performed by the expert system is arranged so that tests relating to components of increasing particularity, and decreasing generality, are performed after the tests relating to more general components.

51 Claims, 13 Drawing Sheets

OTHER PUBLICATIONS

*IBM Technical Disclosure Bulletin,* vol. 22, No. 4, Sep. 1979, Huntley et al., "Error Status Reporting", pp. 1393–1395.

"Error Log and Analysis Supports for User–Written Analysis Programs," IBM Technical Disclosure Bulletin, 16:6:1901–2 (Nov., 1973).

Wasmuth, David B. and Richards, Bruce J., "Predictive Support: Anticipating Computer Hardware Failures," Hewlett Packard Journal, 37:11:30–33, (Nov., 1986).

Rolston, David W., "A Multiparadigm Knowledge–Based System for Diagnosis of Large Mainframe Peripherals," Proceedings of the Third Conference on Artificial Intelligence Applications, pp. 150–155, (Feb., 1987).

Vernel, P. et al., "A New Architecture for Process Control Computers Narcis Project," Euromicro Newsletter, 2:4:34–9 (Oct., 1976).

Wilkinson, "Mind: An Inside Look at Expert System for Electronic Diagnosis", *IEEE Design & Test,* Aug. 1985, pp. 69–77.

Conlon, "Diagnostics: Key to self–sufficiency", *Computer Decisions,* vol. 18, pp. 50–52, Jun. 1986.

Gibson, "NAS claims AI system sniffs out potential mainframe disk crashes", *Computerworld,* Sep. 1987.

IBM Technical Disclosure Bulletin, vol. 30, No. 10 Mar. 1988, pp. 314–316.

Gevarter, "The Nature and Evaluation of Commercial Expert System Building Tools", *Computer,* May 1987, pp. 24–41.

Taylor et al., "An Expert System for Terminal Fault Diagnosis", Date Unknown.

Ennis et al., "A Continuous Real–Time Expert System for Computer Operations", *IBM J. Res. Develop.,* vol. 30, No. 1, Jan. 1986, pp. 15–27.

Cynar et al., "Expert Systems Solve Network Problems and Share the Information", *Data Communications,* May 1986, pp. 187–190.

Anderson et al., "Error Controls" *IBM Technical Disclosure Bulletin,* vol. 16, No. 6, Nov. 1973, pp. 1901–1902.

Waterman, *A Guide to Expert Systems,* Addison–Wesley Pub. Co., 1986, pp. 249–259.

Miller et al., *Artificial Intelligence Applications in the Computer/Electronics Industry,* The Fairmont Press and SEAI Technical Pub., 1988, pp. 33–44.

FIG. 2A-1

30 PERFORM ANALYSIS IN CONNECTION WITH COMMUNICATIONS FAILURE THEORIES

31 ANY COMMUNICATIONS FAILURE THEORIES SATISFIED? — NO

↓ YES

32 GENERATE FAULT THEORY ENTRY FOR STORAGE IN THEORY FILE

33 ACTIVATE NOTIFICATION MODULE AND RECOVER MODULE

34 PERFORM ANALYSIS IN CONNECTION WITH DRIVE-DETECTED NON-MEDIA FAILURE THEORIES

35 ANY DRIVE-DETECTED NON-MEDIA FAILURE THEORIES SATISFIED? — NO

↓ YES

36 GENERATE FAULT THEORY ENTRY FOR STORAGE IN THEORY FILE

37 ACTIVATE NOTIFICATION MODULE AND RECOVER MODULE (A)

40 PERFORM ANALYSIS IN CONNECTION WITH MEDIA FAILURE THEORIES

41 ANY MEDIA FAILURE THEORIES SATISFIED?

42 GENERATE FAULT THEORY ENTRY FOR STORAGE IN THEORY FILE

43 ACTIVATE NOTIFICATION MODULE AND RECOVER MODULE

44 EXIT RETURN CONTROL TO COLLECTOR MODULE

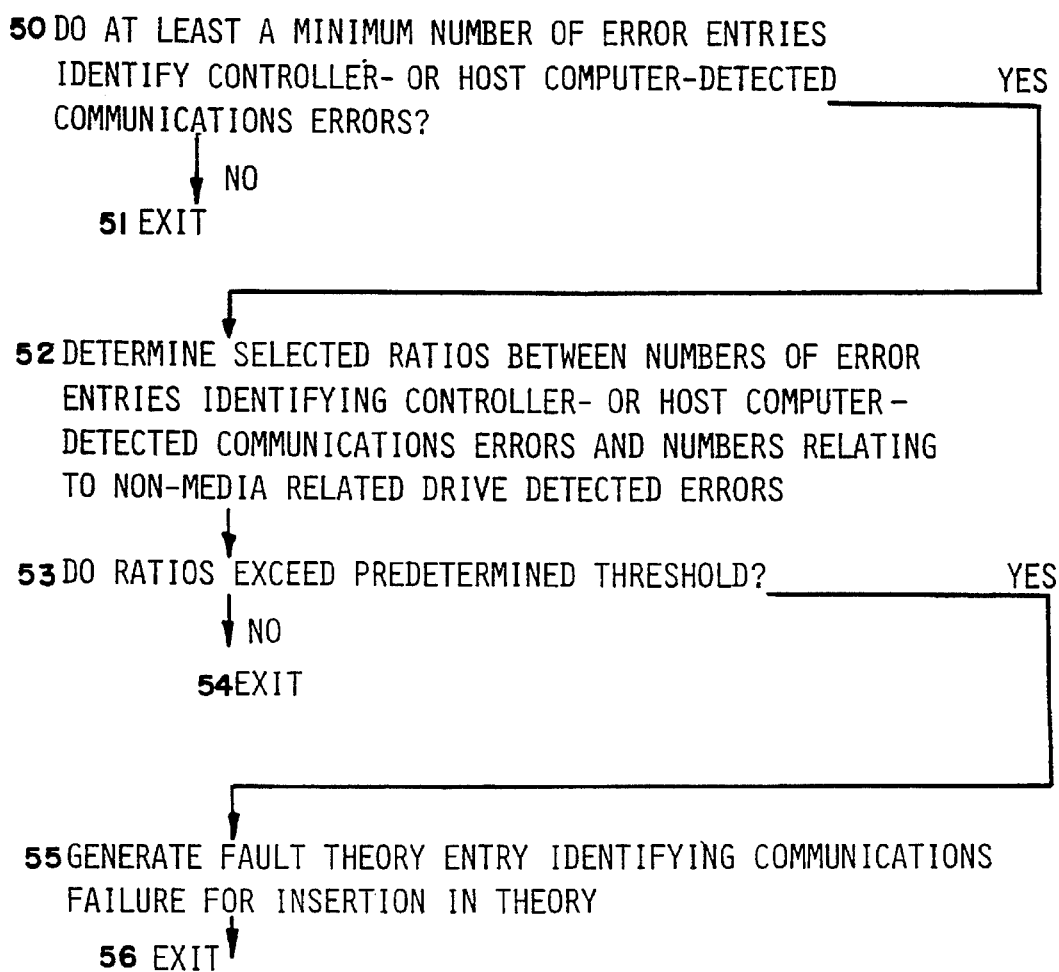

FIG. 2B

COMMUNICATIONS FAILURE ANALYSIS

50 DO AT LEAST A MINIMUM NUMBER OF ERROR ENTRIES IDENTIFY CONTROLLER- OR HOST COMPUTER-DETECTED COMMUNICATIONS ERRORS? — YES
↓ NO
51 EXIT

52 DETERMINE SELECTED RATIOS BETWEEN NUMBERS OF ERROR ENTRIES IDENTIFYING CONTROLLER- OR HOST COMPUTER-DETECTED COMMUNICATIONS ERRORS AND NUMBERS RELATING TO NON-MEDIA RELATED DRIVE DETECTED ERRORS

53 DO RATIOS EXCEED PREDETERMINED THRESHOLD? — YES
↓ NO
54 EXIT

55 GENERATE FAULT THEORY ENTRY IDENTIFYING COMMUNICATIONS FAILURE FOR INSERTION IN THEORY

56 EXIT

FIG. 2D-1

TEST 1 - HEAD MATRIX FAILURE TEST

92 DO ERROR ENTRIES INDICATE ERRORS IN CONNECTION WITH MULTIPLE HEADS? — YES →

↓ NO

93 GO TO TEST II

94 DO ERROR ENTRIES ONLY RELATE TO FOUR HEADS? — YES →

↓ NO

95 GO TO TEST II

96 ARE THE FOUR HEADS ON THE SAME HEAD MATRIX? — YES →

↓ NO

97 GO TO TEST II

100 DO MOST ERROR ENTRIES FOR DISK STORAGE UNIT RELATE TO THE FOUR HEADS? — YES →

↓ NO

101 GO TO TEST II

102 GENERATE FAULT THEORY ENTRY IDENTIFYING INDICATED COMPONENT FOR INSERTION IN THEORY FILE

TEST II - BAD SURFACE TEST

FIG. 2D-3

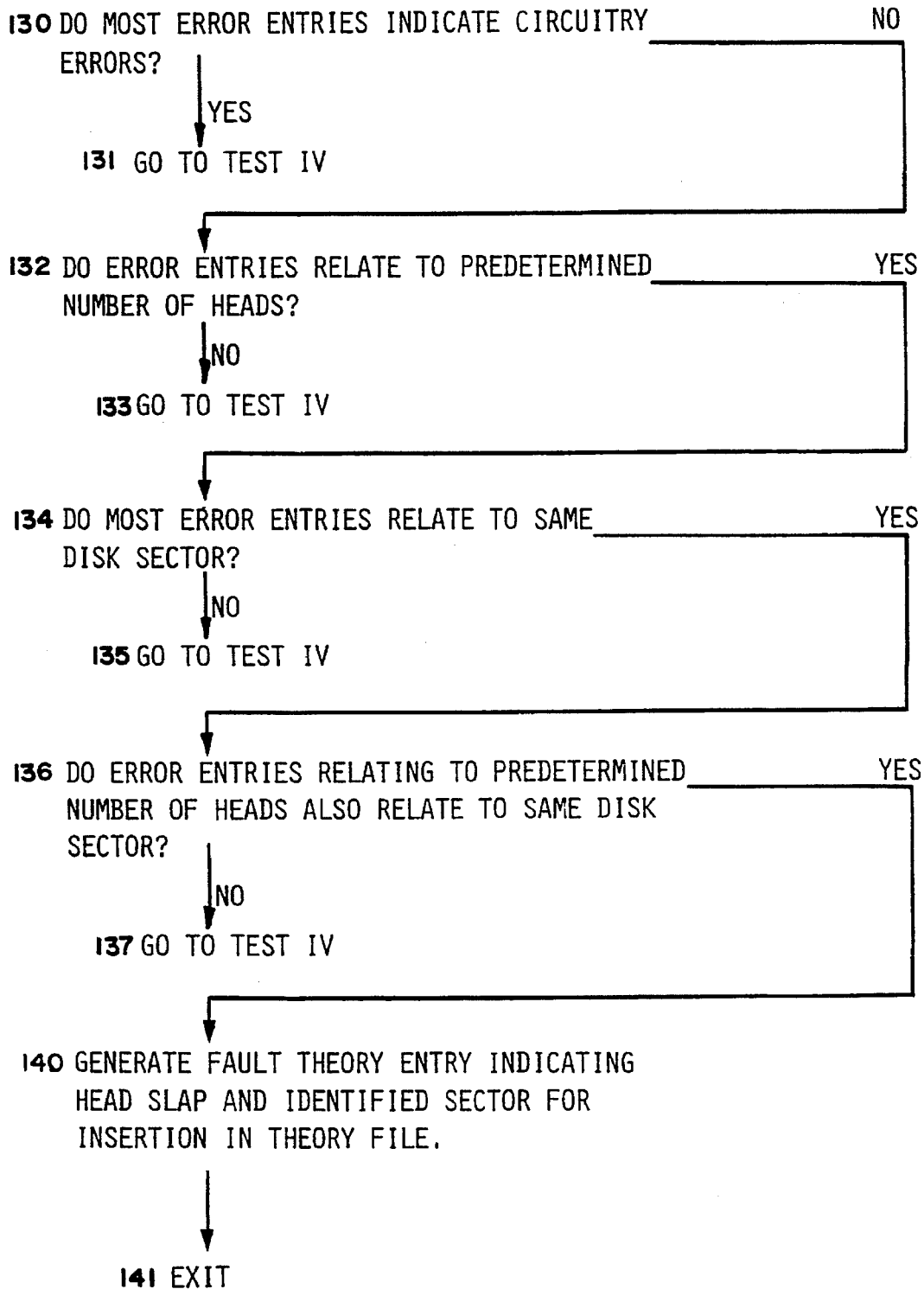

TEST III - HEAD SLAP TEST

130 DO MOST ERROR ENTRIES INDICATE CIRCUITRY ERRORS? — NO

↓ YES

131 GO TO TEST IV

132 DO ERROR ENTRIES RELATE TO PREDETERMINED NUMBER OF HEADS? — YES

↓ NO

133 GO TO TEST IV

134 DO MOST ERROR ENTRIES RELATE TO SAME DISK SECTOR? — YES

↓ NO

135 GO TO TEST IV

136 DO ERROR ENTRIES RELATING TO PREDETERMINED NUMBER OF HEADS ALSO RELATE TO SAME DISK SECTOR? — YES

↓ NO

137 GO TO TEST IV

140 GENERATE FAULT THEORY ENTRY INDICATING HEAD SLAP AND IDENTIFIED SECTOR FOR INSERTION IN THEORY FILE.

141 EXIT

TEST V - READ PATH FAILURE TEST

FIG. 2D-6

TEST VI - BAD HEADS ON OPPOSING SURFACES TEST

180 DO ERROR ENTRIES RELATING TO ONLY TWO — YES
HEADS IDENTIFY RANDOM TRANSFER ERRORS?
↓ NO
181 GO TO TEST VII

182 ARE THESE ERROR ENTRIES MOST OF THE — YES
ERROR ENTRIES?
↓ NO
183 GO TO TEST VII

184 DO THESE ERROR ENTRIES RELATE TO HEADS — YES
ON OPPOSING DISK SURFACES?
↓ NO
185 GO TO TEST VII

186 GENERATE FAULT THEORY ENTRY INDICATING
BAD HEADS ON OPPOSING SURFACES FOR
INSERTION IN THEORY FILE
↓
187 EXIT

EXPERT SYSTEM FOR IDENTIFYING LIKELY FAILURE POINTS IN A DIGITAL DATA PROCESSING SYSTEM

This is a continuation of application Ser. No. 07/175,485 filed on Mar. 30, 1988, now abandoned.

BACKGROUND OF THE INVENTION

1. Field of the Invention

The invention relates generally to the field of digital data processing systems, and more specifically to mechanisms for diagnosing faults and errors in such systems.

2. Description of the Prior Art

Over the past several years, the importance of the availability of computers to government and industry has increased markedly. Computers have been developed and adapted for use not only in fairly conventional activities such as bookkeeping, accounting and inventory control activities but also in more esoteric areas as design, engineering, and manufacturing. Computers have also been adapted for use in many office activities such as document generation using word processing and graphic design. Access to computerized databases, either on-site or over telephone lines, is also important in knowledge-intensive activities.

In attempting to fulfill the ever-increasing demand for both processing power and sharing of information among users, individual computers are being made faster and more complex, and multiple computers are being linked in clusters or networks to facilitate sharing of data and resources, such as telecommunications links, printers, and so forth, among users. As suck computer systems increase in complexity, the likelihood of a failure, either in hardware or in software, also increases. A number of strategies have been devised to minimize disruption, as well as service costs, which may occur as a result of a failure. Typically, however, such strategies rely on the occurrence of a failure, which may be manifested by a user noticing a disruption in service or, potentially more disastrous, the loss of data. At that point, a service technician normally attempts to identify the failed component and repair it, which can require several service trips to the computer site and extensive running of diagnostic programs to identify the failed component. Thus, the repair process may be somewhat costly, not only in service charges but also in the fact that the computer is either not available or provides only a degraded level of performance.

SUMMARY OF THE INVENTION

The invention provides a new and improved expert system for use in conjunction with a digital computer system that monitors the operations of the various components of the computer system and identifies when a component is likely to fail, permitting it to be replaced. The expert system thus identifies likely points of failure in the computer system before a failure is noticeable by a user or operator. In addition, the expert system may notify the computer system's operating system of the component likely to fail so that the operating system may take measures to minimize loss of data or degradation of system performance.

In brief summary, the expert system determines the likelihood of failure of a unit in a computer system. The operating system of the computer system maintains a log of the errors occurring for each unit in the computer system. If a predetermined number of errors have been entered in the log for a specific unit, the expert system retrieves the error entries relating to that unit and processes them to determine whether a failure is likely to occur. In this, the processing performed by the expert system is arranged so that tests relating to components of increasing particularity, and decreasing generality, are performed after the tests relating to more general components.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2D depict flow diagrams detailing failure analyses performed by the expert system depicted in FIG. 1.

DETAILED DESCRIPTION OF AN ILLUSTRATIVE EMBODIMENT

Figure 1:
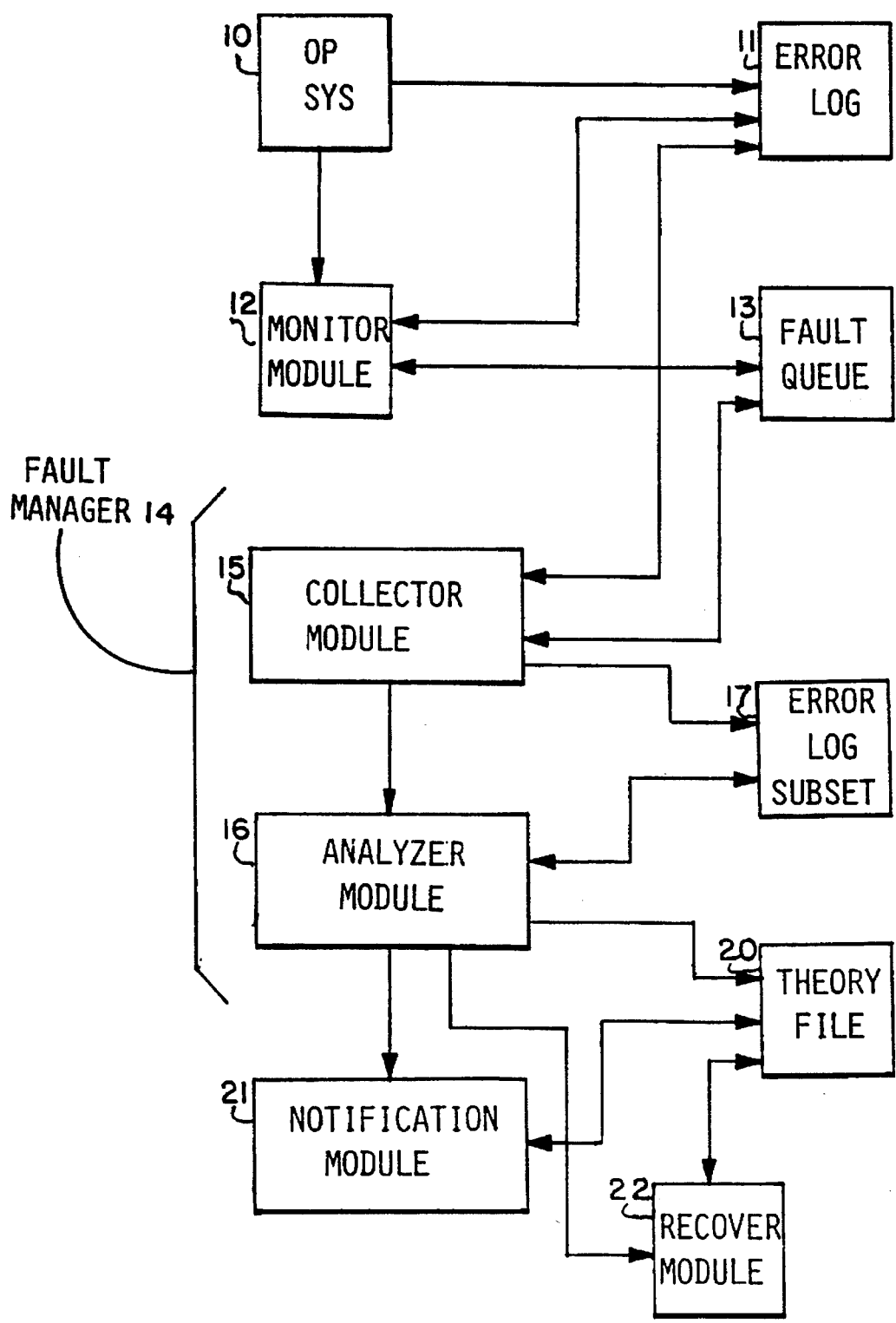
FIG. 1 is a functional block diagram depicting the major components of an expert system constructed in accordance with the invention.

FIG. 1 is a functional block diagram of an expert system for identifying likely failure points in a digital data processing system, that is, a computer system. Preliminarily, it will be appreciated that the expert system may be in the form of a computer program processed by the computer system. Typically, a computer system includes one or more computers. If the computer system includes a plurality of computers, the computers are interconnected by communications links to form clusters or networks to permit the sharing of data and programs among the diverse computers.

Each computer in a computer system comprises a number of units, including one or more processors and memories, and may also include mass storage subsystems, such as disk and/or tape storage systems, as backup and auxiliary storage, and input/output systems such as video display terminals, printers, telecommunications links, and so forth, with all of the units being selectively interconnected by buses. The expert system, which may be run in connection with any of the computers in the network or cluster, detects likely failures of any of the units included therein. In one specific embodiment, the expert system detects likely failures of one specific type of unit, in particular, a disk storage subsystem, but it will be appreciated that similar expert systems, embodying the invention, may be used to detect likely failures in any type of unit which may be included in the computer system.

With reference to FIG. 1, the expert system includes a plurality of operational elements which communicate fault information, which relates to intermittent or permanent failures in the various units comprising the system, through a plurality of data structures. As is conventional, the computer system's operating system 10, which manages the various hardware and software resources included in the computer system, maintains an error log 11 in which it records indicia pertaining to the various faults, errors, and so forth, arising from the operation of the units in the computer system.

When the operating system 10 stores an item in the error log 11, it also enables a monitor module 12, which forms part of the expert system. Upon being enabled by the operating system 10, the monitor module categorizes the various entries in the error log 11 to determine whether there are enough entries relating to possible failure of any specific unit to justify further analysis, and, if so, generates a record for entry in a fault queue 13. It will be appreciated that the likely failure of a unit, or a component thereof, may be presaged by multiple types of errors, which may or may not be directly attributed to or associated with the unit. For example, an impending failure of a bus interface component of a unit, or of a bus wire itself, may give rise to errors indicated for various units attached to the bus. The attribution of errors to the likelihood of failure of particular units depends upon the particular computer system in which the expert system is being run.

In any event, the monitor module 12, upon being enabled by the operating system 10, categorizes the various entries in the error log 11 to determine whether the errors noted therein are random or transient, or whether they indicate that any particular unit in the computer system is likely to fail. In that operation, the monitor module 12 may associate entries in the error log with particular units thereof and determine whether the number of entries associated with any particular unit exceed a predetermined threshold. If not, the monitor module 12 exits, waiting for the operating system 10 to enable it again.

On the other hand, if the monitor module 12 determines that the number of entries associated with any particular unit exceed a predetermined threshold, the monitor module 12 generates a fault entry and inserts it into a fault queue 13. The fault entry identifies the particular unit and the entries in the error log 11 relating to the unit which prompted generation of the fault entry. In addition, if the fault entry is the first entry in the fault queue 13, the monitor module activates a fault manager 14, which processes fault entries in the fault queue 13.

The fault manager 14 includes two modules, namely, a collector module 15 and an analyzer module 16. When initially activated by the monitor module, the collector module retrieves a fault entry from the fault queue 13, identifies the unit in the computer system which prompted generation of the fault entry and retrieves, from the error log 11, the error entries in the error log 11 associated with the unit. The collector module 15 then creates an error log subset 17, which contains the error entries from the error log 11 associated with the unit, and activates the analyzer module 16.

The analyzer module 16 analyzes the error entries in the error log subset 17 provided by the collector module 15 to determine whether the unit is likely to fail. The analyzer module 16 performs the analysis in connection with various failure theories relating to the unit, as described below in detail in connection with FIGS. 2A through 2D, and determines the likelihood of the unit failing. Briefly, each type of error constitutes evidence of the likelihood of failure of the unit according to one or more failure theories. Each failure theory, in turn, relates to a specific one of a plurality of modes in which the unit may fail, with each failure mode being directed to a particular component in the unit that may fail. Each failure theory requires that a predetermined number of errors relating to the component occur in order for the expert system, and particularly the analyzer module 16, to deem the failure likely to occur.

The analyzer module 16 determines whether the error log subset 17 contains sufficient error entries which are related to any of the various failure theories, and, if so, generates a fault theory entry identifying the unit and the fault theory and stores them in a theory file 20.

After the analyzer module 16 has generated a fault theory entry and stored it in the theory file 20, it activates a notification module 21 and a recover module 22. The notification module queries the theory file 20 and, using the fault theory entries stored therein, generates an operator notification message to notify the system operator of the likelihood of a failure. The operator notification message permits the operator to initiate recovery procedures in connection with the failure indicated thereby. The notification module 21 also generates a service technician notification message that includes indications of the types of errors which gave rise to the satisfaction of a failure theory and the determination that a failure is likely to occur, which may be used by a service technician during a repair operation.

Upon activation by the analyzer module 16, the recover module 22 also queries the theory file 20 and initiates selected recovery operations which may be indicated in response to the various fault theory entries stored therein. Specifically, in one embodiment in which the expert system is used to determine the likelihood of failures of various disk storage units in a computer system, if a fault theory entry in the theory file 20 indicates that a disk storage unit may be failing, the recover module 22 may enable the operating system to use another disk storage unit as a shadow or backup. In that case, the operating system enables data stored on the failing disk storage unit to also be stored on the other disk storage unit, thereby reducing the likelihood that data will be lost. Furthermore, the data so stored is thus available on the other disk storage unit during the repair operation.

As noted above, the analyzer module 16 analyzes the error entries in the error log subset 17 in connection with a plurality of failure theories to determine whether the unit is likely to fail. If the analyzer module 17 determines that the error entries do not satisfy any of the failure theories, it returns control to the collector module 15, which then processes the next entry in the fault queue 13. The fault manager 14 iteratively processes the entries in the fault queue 13 provided by monitor module 12, until all of the entries have been processed. It will be appreciated that the computer system may run monitor module 12 and the modules comprising the fault manager 14 concurrently, and so the monitor module 12 may load entries in the fault queue 13 concurrently with removal by the fault manager 14, and specifically by the collector module 15, for processing.

As described above, the analyzer module 16 performs analyses using the error entries in the error log subset 17 in connection with a plurality of failure theories. The failure theories are applied in a hierarchical fashion, since errors which may be attributed by the operating system 10 to a plurality of components of the same type in a unit may actually provide evidence of the likely failure of another component.

For example, in a disk storage unit, while a number of errors attributed to a single read/write head may indicate likely failure of that head, random errors attributed to a plurality of read/write heads may indicate likely failure of another component which may be connected to all of those heads, such as circuitry that energizes the heads for writing or that receives the read signals from the heads. To ensure that the other component is the one identified as being likely to fail, rather than all of the heads, the analyzer module 16 performs the analysis in connection with that other component before performing the analyses in connection with the heads.

In one embodiment, the failure theories are divided into three groups, which are identified generally as communications failure theories, drive-detected non-media failure theories, and media failure theories. Generally, the communications failure theories are directed to errors in connection with information received from the drive storage unit, including such errors as indications of failure of the disk storage unit to execute a command within a selected timeout interval, of dropouts of certain signals from the disk storage unit, of parity errors in signals from the disk storage unit, and so forth. The controller in the mass storage subsystem including the disk storage unit may notify the operating system 12 of any such errors in connection with requests for error recovery by means of, for example, interrupt service.

The drive-detected non-media failure theories are generally directed to errors in connection with transmissions of information to the drive storage unit by other units in the computer system. The disk storage unit may notify the operating system 12 of any such errors in connection with requests for error recovery by, for example, interrupt service.

Finally, the media failure theories are generally directed to such errors as may be indicated by timing, head/disk movement or error detection/correction circuitry, which may indicate likelihood of failure of one or more read/write heads, the circuitry for energizing the heads, servo circuitry, failures, such as scratches, in the media, and so forth within the disk storage unit, and may also indicate the likelihood of failure of the error detection/correction circuitry itself.

Figure 2C:
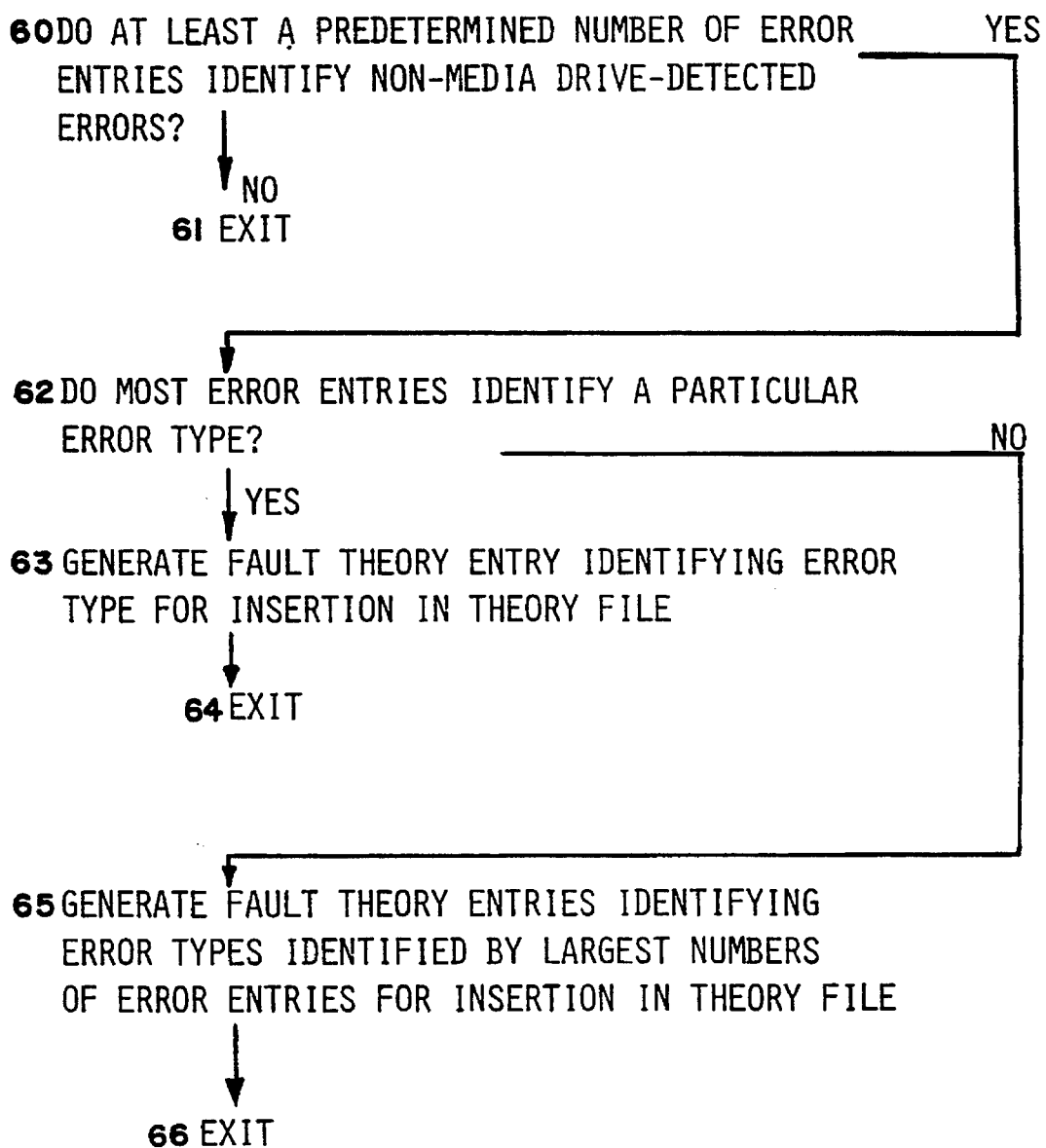
Figures 2, 2D:
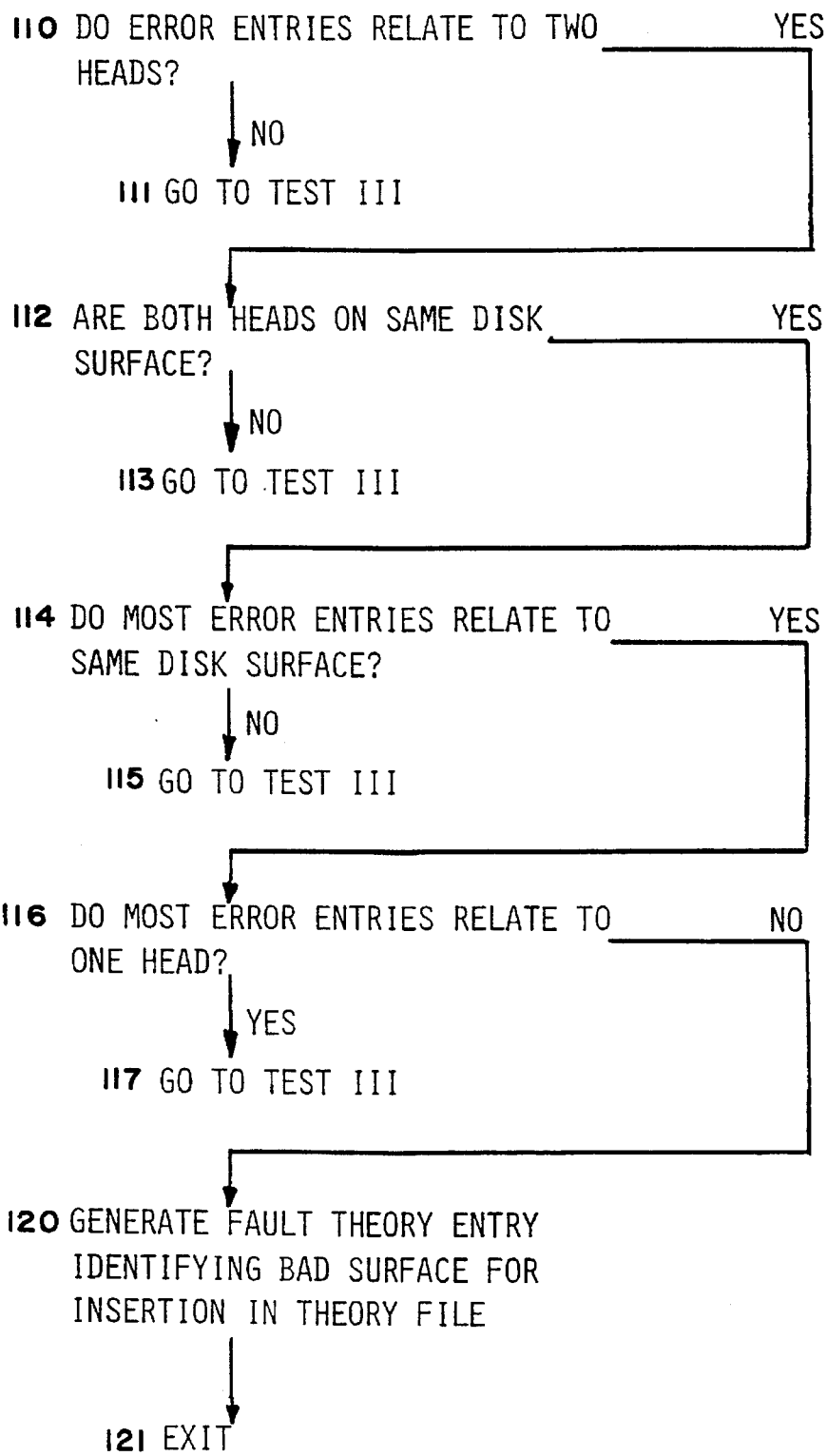

With this background, the general operations performed by one embodiment of the analysis module 16 in connection with the error entries in the error log subset 17 are depicted in FIGS. 2A-1 and 2A-2. It will be appreciated that the specific operations performed will be based on the specific units, and their components, with which the expert system (FIG. 1) is to be used. With reference to FIG. 2A-1, the analysis module 16 first performs an analysis operation in connection with the communications failure theories (step 30). The analysis operation performed in step 30 is described below in connection with FIG. 2B. If the analysis module 16 determines that a communications failure theory is satisfied (step 31) it generates a fault theory entry and stores it in the theory file 20 (step 32). The analysis module 16 thereafter activates the notification module 21 to generate an appropriate message for the operator and the recover module 22 to take suitable recovery operations (step 33).

If, in step 31, the analysis module 16 determines that the error indications do not satisfy a communications failure theory, the analysis module sequences to step 34, in which it performs an analysis operation in connection with the drive-detected non-media failure theories. The analysis operation performed in step 34 is described below in connection with FIG. 2C. If the analysis module 16 determines that a drive-detected non-media failure theory is satisfied (step 35) it generates a fault theory entry and stores it in the theory file 20 (step 36). The analysis module 16 thereafter activates the notification module 21 to generate an appropriate message for the operator and the recover module 22 to take suitable recovery operations (step 37).

On the other hand, if, in step 35, the analysis module 16 determines that the error indications do not satisfy a drive-detected non-media failure theory, the analysis module sequences to step 40, in which it performs an analysis operation in connection with the media failure theories. The analysis operation performed in step 40 is described below in connection with FIG. 2D. If the analysis module 16 determines that a media failure theory is satisfied (step 41) it generates a fault theory entry and stores it in the theory file 20 (step 42). The analysis module 16 thereafter activates the notification module 21 to generate an appropriate message for the operator and the recover module 22 to take suitable recovery operations (step 43).

Finally, if, in step 41, the analysis module 16 determines that the error indications do not satisfy a media failure theory, the analysis module sequences to step 44, in which it exits and returns control to the collector module 15. The collector module 15 may then process the next fault entry from the monitor module 12 in the fault queue 13. As described above, if the fault queue 13 is empty, the collector module 15 terminates operation, pending reactivation by the monitor module 12.

As noted above, the operations performed by the analysis module 16 in connection with the communications failure theories are described in connection with FIG. 2B. Such theories relate to errors detected by the host computer or the controller controlling the disk storage unit, such as command timeouts, errors in transmission of certain signals, parity or protocol errors in transmissions, and the like. With reference to FIG. 2B, the analyzer module 16 determines whether at least a predetermined number of the error entries in the error log subset 17 relate to communications errors as detected by controller controlling the disk storage unit or by the host computer (step 50). If there are insufficient numbers of such error entries, the analyzer module 16 exits the communications failure analysis (step 51).

If, on the other hand, the analyzer module 16 determines that the error log subset 17 contains sufficient numbers of such error entries, it sequences to step 52 to provide various ratios relating to error entries relating to the communications errors and non-media drive detected errors (step 52). Since errors giving rise to error entries identifying communications entries may also give rise to error entries identifying non-media drive detected errors, the ratios provided in step 52 assist in determining which is the cause of the errors. If the ratios do not indicate that the errors are due to communications failure (step 53), the analyzer module 16 exits (step 54).

If, on the other hand, the analyzer module 16 in step 53 determines that the ratios do indicate that the errors are due to communications failure, it generates a fault theory entry so indicating for insertion into the theory file 20 (step 55) and exits (step 56).

If the analyzer module 16 exits in either steps 51 or 53, it sequences to perform the analysis relating to drive detected non-media failure theories (step 34, FIG. 2A-1), which is depicted in FIG. 2C. Such theories relate to errors detected by the disk storage unit, such as errors in transmission of certain signals, parity or protocol errors in transmissions, and the like. With reference to FIG. 2C, the analyzer module 16 initially determines whether the error log subset 17 contains a threshold number of error entries which relate to non-media drive-detected errors. If the error log subset 17 does not contain the threshold number of such error entries, the analyzer module 16 sequences to step 61, in which it exits.

On the other hand, if, in step 60, the analyzer module 16 determines that the error log subset 17 does contain the threshold number of such error entries, it then determines whether most relate to a particular type of error (step 62), and, if so, it generates a fault theory entry identifying the error type for insertion in the theory file 20 (step 63) and then exits (step 64). If no single error type predominates among the error entries identifying the non-media drive detected errors, the analyzer module 16 generates one or more fault theory entries identifying the error types identified by the largest number of error entries for storage in the theory file 20 (step 65). Following step 65, the analyzer module 16 exits (step 66).

If the analyzer module 16 exits in step 61, it sequences to perform analysis relating to media-related failure theories (step 40, FIG. 2A-2), which are exemplified in FIGS. 2D-1 through 2D-8. In brief, the media-related failure theories relate to two general classes of errors. One class, namely, random errors, generally includes detection of invalid headers, loss of data synchronization, correctable or uncorrectable data errors detected by error detection and correction circuitry, and so forth. The section class of media related failure theories, namely, drive-detected errors generally related to the drive circuitry or other hardware problems, includes seek errors, off track errors, and errors due to problems with read and write circuitry, including the heads, the servo system, and so forth.

FIGS. 2D-1 through 2D-8 depict a series of eight illustrative tests which the analyzer module 16 performs seriatim. The tests are ordered hierarchically so that later tests are addressed to likelihood of failure of components of increasing particularity, since, as noted above, errors which may be attributed by the operating system 10 to a plurality of more particular components of the same type in a unit may actually provide evidence of the likely failure of another component of more general applicability. Thus, the analyzer module 16 performs a test to determine likelihood of failure of a head matrix, as shown in FIG. 2D-1, before it performs a test to determine likelihood of failure of a single head, as shown in FIG. 2D-8, since a head matrix is a component that relates to a plurality of heads. If the analyzer module 16 were to perform the head failure test prior to performing the head matrix test, it would likely terminate testing on determining that the single head was likely to fail, and never reach the head matrix test. It will be appreciated that, if one test is satisfied, that is, if the analyzer module 16 determines from a test in one of FIGS. 2D-1 through 2D-8 that a failure is likely, it does not progress to the subsequent tests.

The sequences of operations depicted in FIGS. 2D-1 through 2D-8 are generally self-explanatory, and will not be described in detail. In each test, the analyzer module 16 performs a predetermined series of operations in connection with error entries in the error log subset 17. If criteria set forth in a test are satisfied, it generates a fault theory entry identifying the likely failure and inserts it into the theory file 20. Otherwise, the analyzer module 16 steps to the next test, or, in the case of the last test, exits and returns control to the collector module 15.

Generally, in the head matrix failure test depicted in FIG. 2D-1, since a head matrix relates to the operation of four read/write heads, the analyzer module 16 performs a series of steps, first, to determine whether the error log subset 17 contains error entries that relate to more than one head (step 92), and, second, to determine whether most of the error entries relate to heads related to a specific head matrix (steps 94, 96 and 100). If so, it generates a fault theory entry for storage in the theory file 20 that identifies the head matrix as being likely to fail (step 02).

If the analyzer module 16 determines, in the sequence depicted in FIG. 2D-1, that the head matrix failure is unlikely, it initiates a test, as depicted in FIG. 2D-2, to determine the likelihood of a bad disk surface, that is, a generally bad storage medium. This test requires errors generally evenly distributed among read/write heads that operate in connection with the disk surface.

Figures 2, 2D, 3, 4, 4A, 4B:
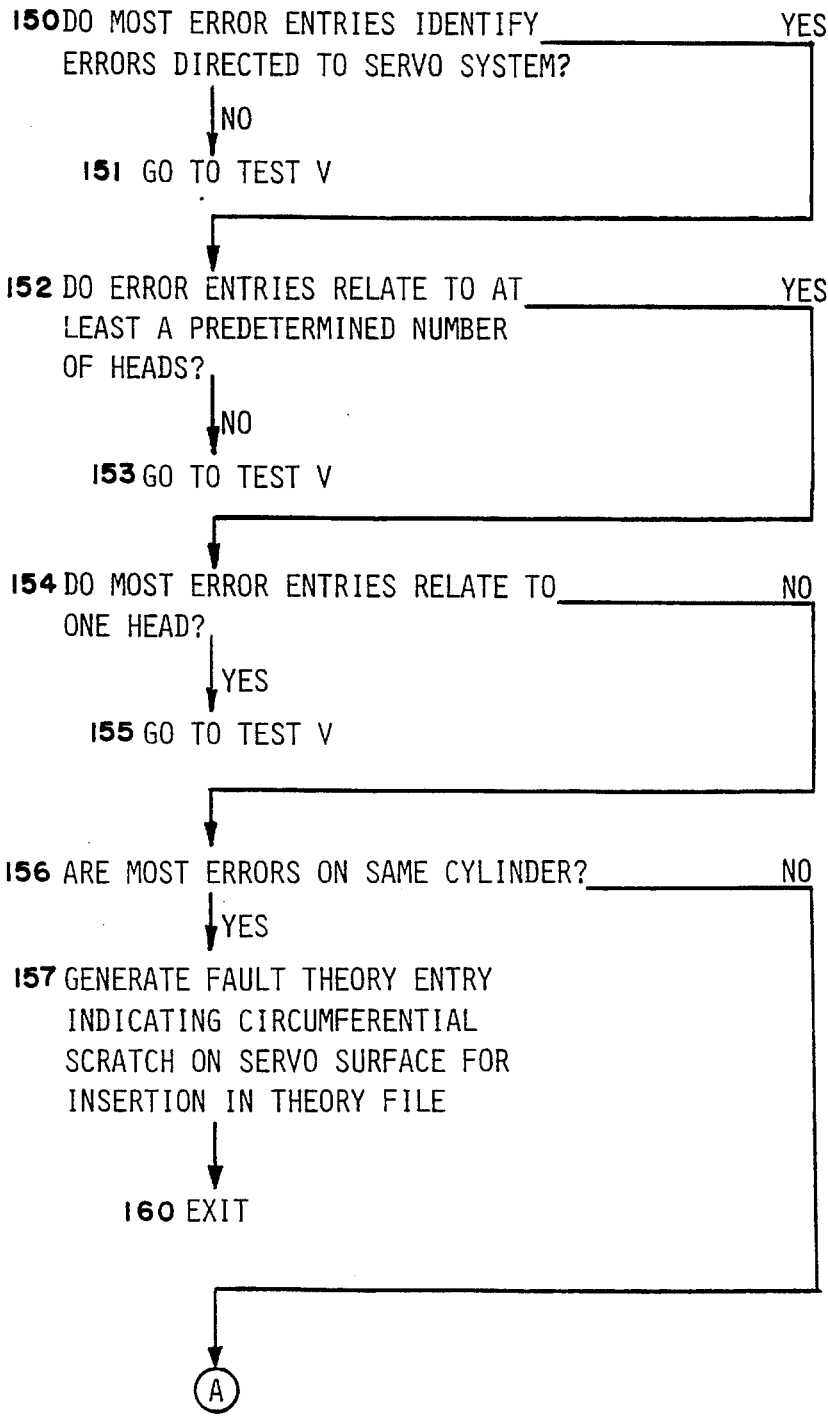
Figures 2, 2D, 3, 4, 4B:
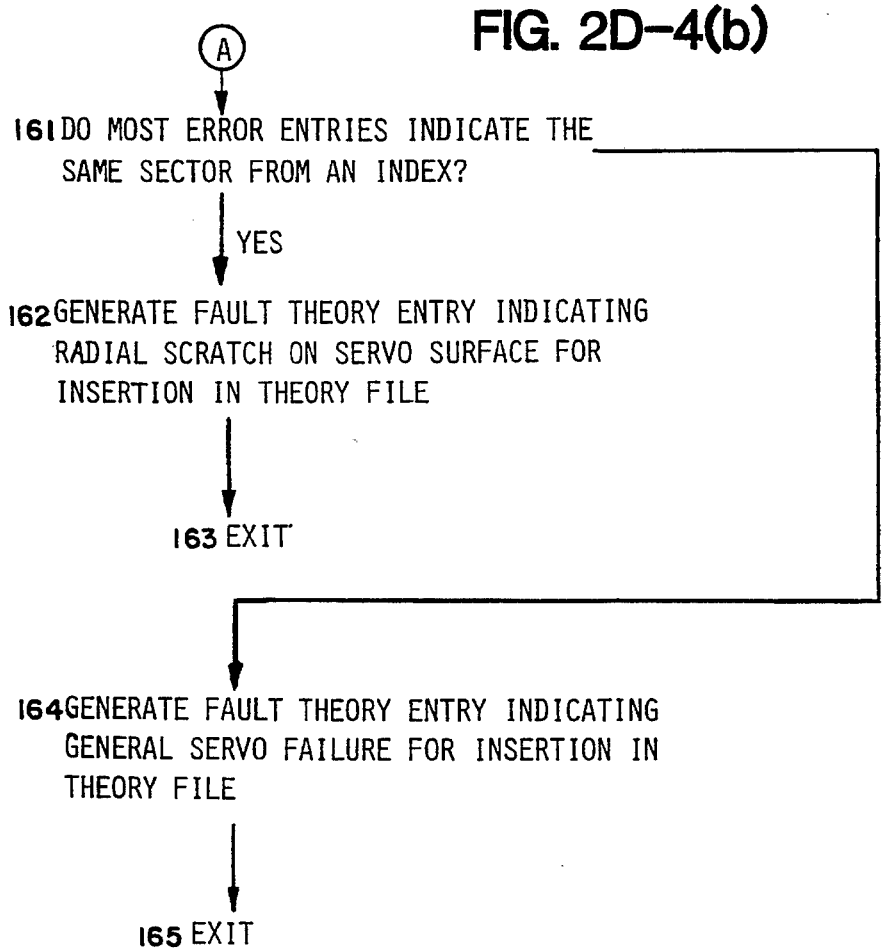
Figures 2, 2D, 3, 4, 5:
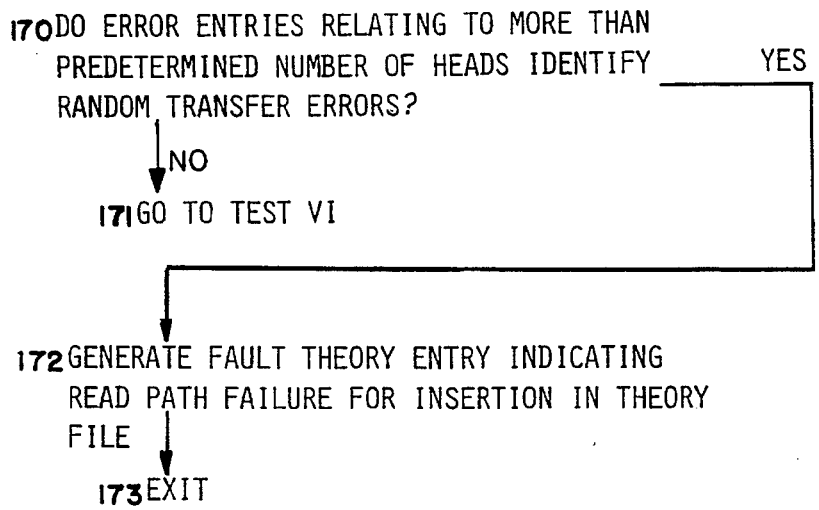
Figures 2, 2D, 3, 4, 5, 6, 7:
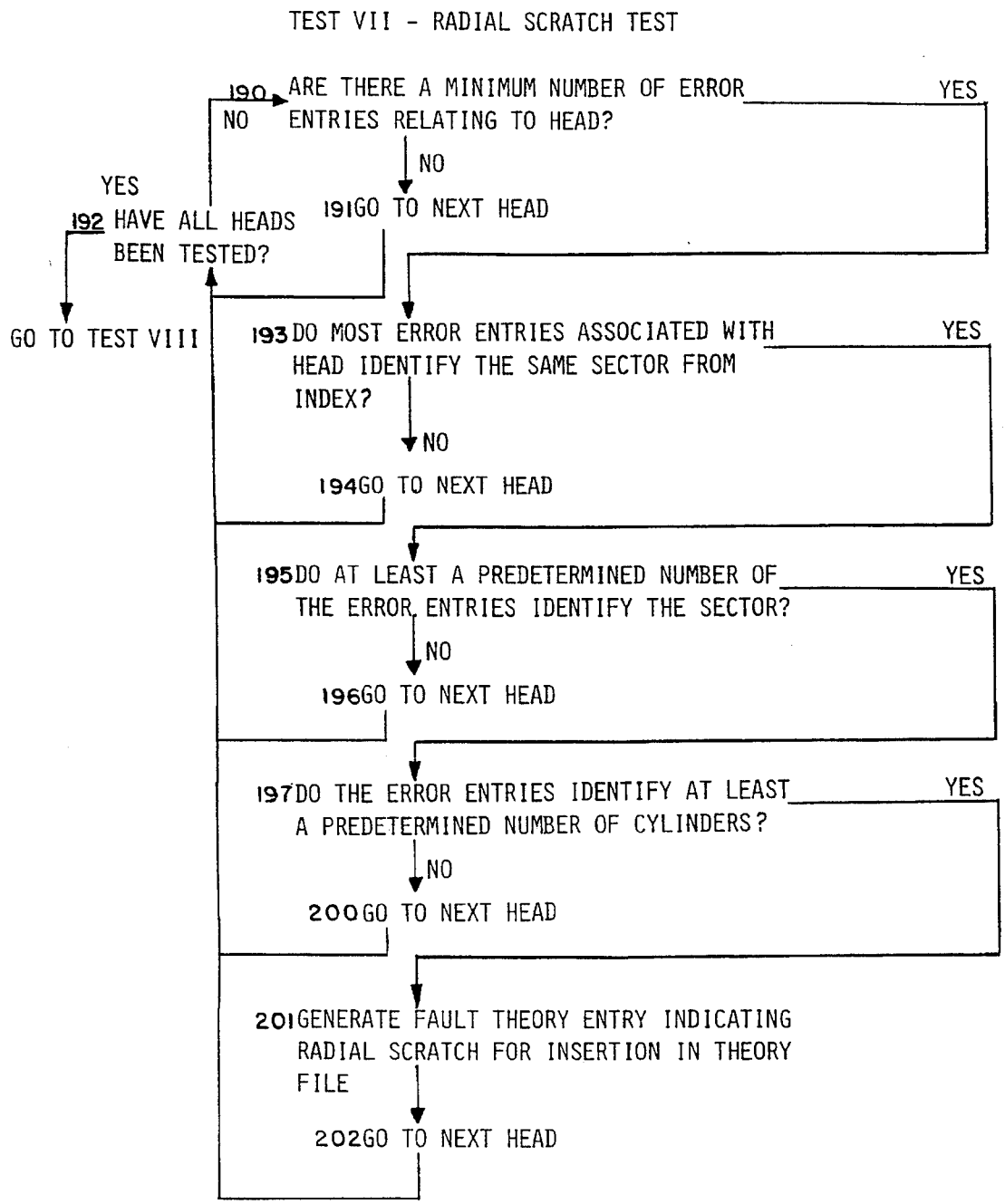
Figures 2, 2D, 3, 4, 5, 6, 7, 8:
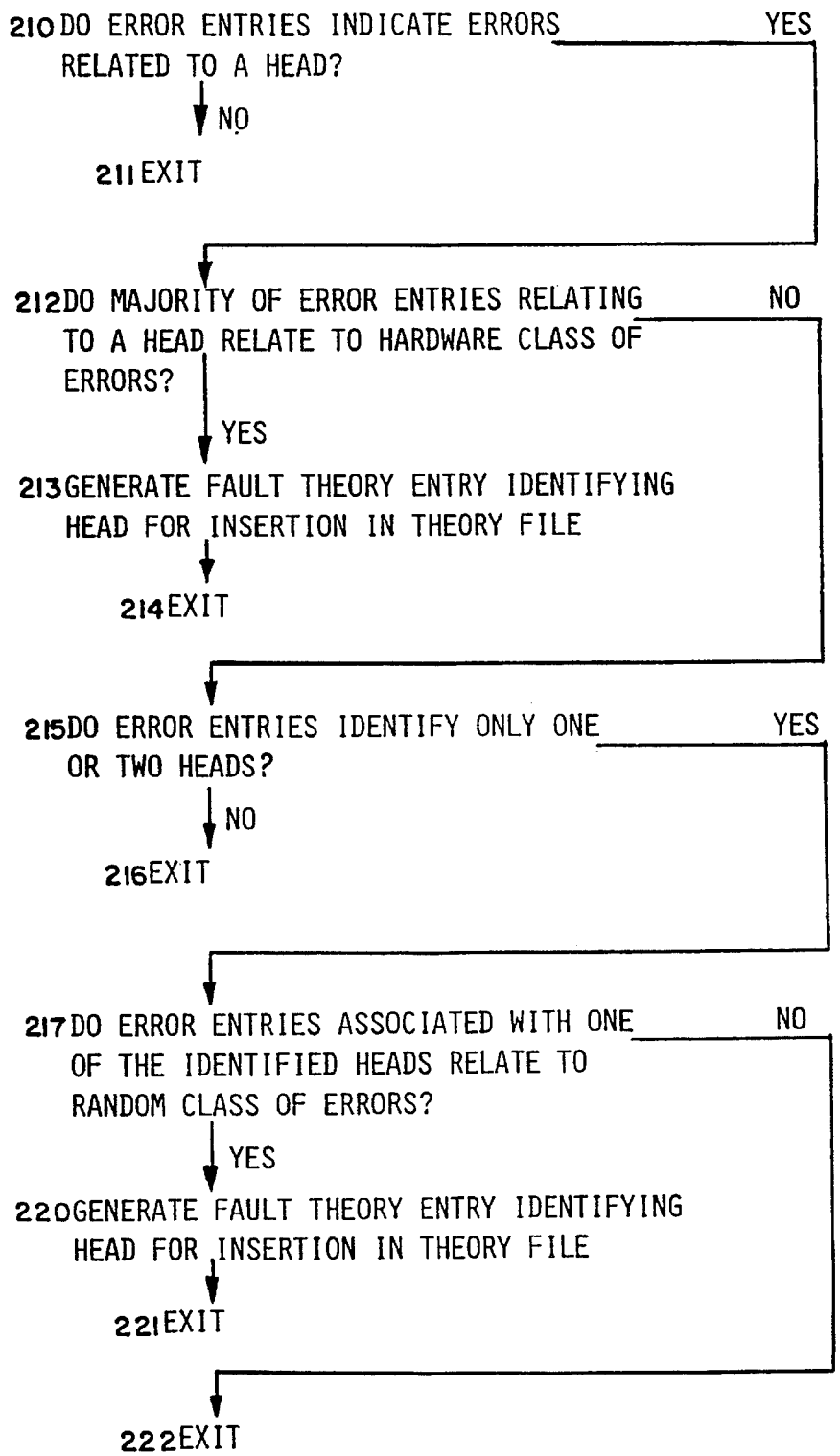

If the analyzer module 16 determines that a bad disk surface is not indicated, in the sequence depicted in FIG. 2D-2, it steps to the sequence depicted in FIG. 2D-3 to perform a test to determine the likelihood of one sector of the disk being bad, which generally occurs as a result of a "head slap" that is a head striking the disk generally resulting in a defect in one sector. In a disk storage unit having multiple read/write heads for each disk surface, the analyzer module 16 determines whether at least a predetermined threshold number of error entries in the error log subset 17 identify at least some of the heads on the same disk surface and identify an error occurring in the same sector.

If the analyzer module 17 determines that a "head slap" is not indicated, in the sequence depicted in FIG. 2D-3, it steps to the sequence depicted in FIGS. 2D-4(a) and 2D-4(b) to determine the likelihood of failure of the disk storage unit's servo system. In that sequence, the analyzer module 16 first determines that error entries identify servo errors and that they relate to multiple heads in the disk storage unit. The analyzer module 16 then determines the likelihood of a circumferential scratch (step 156) or radial scratch (step 161) on the servo surface of the disk. If the analyzer module 16 determines that neither a circumferential nor a radial scratch is likely, it determines that a general servo failure is likely.

Thereafter, the analyzer module 16 performs a read path failure test (FIG. 2D-5) to determine the likelihood of a general read path failure. If a predetermined number of error entries identify random errors, indicating detection of invalid headers, loss of data synchronization, correctable or uncorrectable data errors detected by error detection and correction circuitry, and so forth, the analyzer module 16 determines that a general read path failure is likely.

Three additional tests are depicted in the Figs. Following the read path failure test (FIG. 2D-5), the analyzer module 16 performs a test to determine whether heads on opposing, that is, facing, disk surfaces are likely to fail (FIG. 2D-6), to determine whether a radial scratch is present on a disk surface (FIG. 2D-7), and a test to indicate whether a specific read/write head is likely to fail (FIG. 2D-8). In the test depicted in FIG. 2D-7, the test is iteratively performed in connection with each of the heads in the disk storage unit.

It will be appreciated that the specific tests, and the order in which they are performed, in connection with the expert system are determined by the specific units in connection with which the expert system (FIG. 1) is to be used. If the expert system is to be used in connection with the controller of the disk storage unit, as well as the disk storage unit itself, the expert system will be required to perform additional tests directed to the controller prior to performing the tests directed to the disk storage unit. Similarly, if the expert system is used in connection with a clustered or networked computer system comprising a plurality of computers which communicate over one or more communications link, the expert system may be run on one computer in the digital data processing system and may, with suitable additions to detect errors in a processor, memory, and other types of components of a computer, be used to detect the likelihood of failures occurring in other computers in the computer system.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of detecting one of a plurality of likely failures of components in a digital data processing system, comprising the steps of storing a plurality of error entries, each error entry containing a plurality of differing indicia identifying components of differing types associated with a single error event in said digital data processing system, analyzing, through use of a digital expert system, said plurality of differing indicia contained within said error entries, by determining whether there is a substantially random distribution of indicia with respect to a plurality of components of a given type or a concentration Of indicia with respect to one or more components of a given type as at least one step in identifying a pattern of identifying components of differing types that corresponds with one of a plurality of failure theories, and, based on said failure theory, identifying a said likely failure of a said component.

2. A method in accordance with claim 1, wherein said digital data processing system comprises a plurality of units each comprising a plurality of components, said method further comprises the steps of monitoring said stored error entries to determine whether the number of stored error entries associated with a particular unit exceeds a threshold, and collecting said stored error entries associated with said particular unit if said number of said stored entries associated with said particular unit exceeds said threshold, and said analysis step comprises analyzing said collected error entries associated with said particular unit, to identify said pattern of said differing types of error events that corresponds with said one of said plurality of failure theories.

3. A method in accordance with claim 2, wherein said step of monitoring error entries associated with a particular unit comprises generating a fault entry for each unit having error entries that exceed said threshold, and inserting said fault entries into a fault queue.

4. A method in accordance with claim 3, wherein each said fault entry identifies a unit and identifies error entries associated with said unit.

5. A method in accordance with claim 4, wherein said step of collecting said error entries associated with said particular unit comprises retrieving a fault entry from said fault queue, retrieving, from an error log, said error entries associated with said unit identified in said fault entry, and inserting said error entries into an error log subset.

6. A method in accordance with claim 1, wherein said failure theories comprise communication failure theories, drive-detected non-media failure theories, and media failure theories.

7. A method in accordance with claim 1, wherein said analyzing step comprises a hierarchical sequence of pattern analysis steps in which said error entries are tested for patterns relating to failures of relative generality before said error entries are tested for patterns relating to failures of relative particularity.

8. A method in accordance with claim 1, wherein said step of storing said error entries is performed by an operating system that stores said error entries in an error log.

9. A method in accordance with claim 1, wherein said analyzing step comprises storing said failure theories in a theory file.

10. A method in accordance with claim 9, wherein said step of identifying a likely failure of a component comprises querying said theory file, and, based on a failure theory in said theory file, notifying a user of a likely failure of said component.

11. A method in accordance with claim 9, wherein said step of identifying a likely failure of a component comprises querying said theory file, and, based on a failure theory in said theory file, initiating recovery operations, to avoid data loss.

12. A method in accordance with claim 1, wherein said step of identifying a likely failure of a component comprises predicting failure of a component before said component actually fails.

13. A method in accordance with claim 1, wherein said step of identifying a likely failure of a component comprises detecting an actual failure of a component.

14. A method in accordance with claim 1, wherein said step of analyzing said error entries comprises the steps of performing analysis in connection with communications failure theories, if no communications failure theories are satisfied, performing analysis in connection with drive-detected non-media failure theories, and if no drive-detected non-media failure theories are satisfied, performing analysis in connection with media failure theories.

15. A method in accordance with claim 1, wherein said step of analyzing said error entries comprises the steps of determining whether a sufficient number of error entries that identify communications errors have been stored to justify generating a fault theory entry indicating a likely communications failure, if said sufficient number of error entries that identify communications errors have been stored, comparing at least one number representing occurrences of said error entries that identify communications errors with at least one number representing occurrences of error entries that identify non-media drive-detected errors, and determining whether a ratio of said number representing occurrences of error entries that identify communications errors to said number representing occurrences of error entries that identify non-media drive-detected errors is sufficient to justify generating a fault theory indicating a likely communications failure.

16. A method in accordance with claim 1, wherein said step of analyzing said error entries comprises the steps of determining whether a sufficient number of error entries that identify non-media drive-detected errors have been stored to justify generating a fault theory entry indicating a likely drive-detected non-media failure, if said sufficient number of said error entries that identify non-media drive-detected errors have been stored, and if most of said error entries that identify non-media drive-detected errors identify a common error type, generating a fault theory entry indicating a likelihood of said common error type, and if said sufficient number of said error entries that identify non-media drive-detected errors have been stored, and if most of said error entries that identify non-media drive-detected errors do no identify a common error type, generating fault theory entries identifying error types most frequently identified by said error entries that identify non-media drive-detected errors.

17. A method in accordance with claim 1, wherein said step of analyzing said error entries comprises the steps of performing analysis in connection with head matrix failure, if no head matrix failure is likely, performing analysis in connection with bad surfaces, if there are no likely bad surfaces, performing analysis in connection with head slaps, if no head slap failure is likely, performing analysis in connection with errors directed to a servo system, if no servo system failure is likely, performing analysis in connection with read path failure, if no read path failure is likely, performing analysis in connection with bad heads on opposing media surfaces, if there are no likely bad heads on opposing media surfaces, performing analysis in connection with radial scratches, and, if there are no likely radial scratches, performing analysis in connection with bad heads.

18. An expert system for detecting one of a plurality of likely failures of components in a digital data processing system, comprising a collector module means for collecting a plurality of stored error entries, each error entry containing a plurality of differing indicia identifying components of differing types associated with a single error event in said digital data processing system, and an analyzer module means for analyzing said plurality of differing indicia contained within said error entries, by determining whether there is a substantially random distribution of indicia with respect to a plurality of components of a given type or a concentration of indicia with respect to one or more components of a given type as at least one step in identifying a pattern of indicia identifying components of differing types that corresponds with one of a plurality of failure theories, said analyzer module means identifying a said likely failure of a said component based on said failure theory, said collector module means and said analyzer module means being adapted for implementation by a digital data processing system.

19. An expert system in accordance with claim 18, wherein said digital data processing system comprises a plurality of units each comprising a plurality of components, said digital data processing system further comprises a monitor module means for monitoring said error entries to determine whether the number of error entries associated with a particular unit exceeds a threshold, and said collector module means collects said error entries associated with said particular unit for purposes of pattern analysis.

20. An expert system in accordance with claim 19, wherein said monitor module means generates a fault entry for each unit having error entries that exceed said threshold, and inserts said fault entries into a fault queue.

21. An expert system in accordance with claim 20, wherein each said fault entry identifies a unit and identifies error entries associated with said unit.

22. An expert system in accordance with claim 21, wherein said collector module means retrieves a fault entry from said fault queue, retrieves, from an error log, said stored error entries associated with said unit identified in said fault entry, and inserts said error entries into an error log subset.

23. An expert system in accordance with claim 18, wherein said failure theories comprise communication failure theories, drive-detected non-media failure theories, and media failure theories.

24. An expert system in accordance with claim 18, wherein said analyzer module means analyzes said error entries in a hierarchical sequence of pattern analysis steps in which said error entries are tested for patterns relating to failures of relative generality before said error entries are tested for patterns relating to failures of relative particularity 25. An expert system in accordance with claim 18, further comprising an operating system for storing said error entries in an error log.

26. An expert system in accordance with claim 18, wherein said analyzer module means stores said failure theories in a theory file.

27. An expert system in accordance with claim 26, further comprising a notification module means for querying said theory file, and, based on a failure theory in said theory file, notifying a user of likely failure of said component.

28. An expert system in accordance with claim 26, further comprising a recovery module means for querying said theory file, and, based on a failure theory in said theory file, initiating recovery operations, to avoid data loss.

29. An expert system in accordance with claim 18, wherein said analyzer module means predicts failure of a component before said component actually fails.

30. An expert system in accordance with claim 18, wherein said analyzer module means detects an actual failure of a component.

31. An expert system in accordance with claim 18, wherein said analyzer module means performs analysis of said error entries in connection with communications failure theories, if no communications failure theories are satisfied, performs analysis of said error entries in connection with drive-detected non-media failure theories, and if no drive-detected non-media failure theories are satisfied, performs analysis of said error entries in connection with media failure theories.

32. An expert system in accordance with claim 18, wherein said analyzer module means determines whether a sufficient number of error entries that identify communications errors have been stored to justify generating a fault theory entry indicating a likely communications failure, if said sufficient number of error entries that identify communications errors have been stored, said analyzer module means compares at least one number representing occurrences of said error entries that identify communications errors with at least one number representing occurrences of error entries that identify non-media drive-detected errors, and said analyzer module means determines whether a ratio of said number representing occurrences of error entries that identify communications errors to said number representing occurrences of error entries that identify non-media drive-detected errors is sufficient to justify generating a fault theory indicating a likely communications failure.

33. An expert system in accordance with claim 18, wherein said analyzer module means determines whether a sufficient number of error entries that identify non-media drive-detected errors have been stored to justify generating a fault theory entry indicating a likely drive-detected non-media failure, if said sufficient number of said error entries that identify non-media drive-detected errors have been stored, and if most of said error entries that identify non-media drive-detected errors identify a common error type, said analyzer module means generates a fault theory entry indicating a likelihood of said common error type, and if said sufficient number of said error entries that identify non-media drive-detected errors have been stored, and if most of said error entries that identify non-media drive-detected errors do no identify a common error type, said analyzer module means generates fault theory entries identifying error identify non-media drive-detected errors types most frequently identified by said error entries that 34. An expert s stem in accordance with claim 18, wherein said analyzer module means performs analysis in connection with head matrix failure, if no head matrix failure is likely, said analyzer module means performs analysis in connection with bad surfaces, if there are no likely bad surfaces, said analyzer module means performs analysis in connection with head slaps, if no head slap failure is likely, said analyzer module means performs analysis in connection with errors directed to a servo system, if no servo system failure is likely, said analyzer module means performs analysis in connection with read path failure, if no read path failure is likely, said analyzer module means performs analysis in connection with bad heads on opposing media surfaces, if there are no likely bad heads on opposing media surfaces, said analyzer module means performs analysis in connection with radial scratches, and if there are no likely radial scratches, said analyzer module means performs analysis in connection with bad heads.

35. An expert system for detecting one of a plurality of likely failures of components in a digital data processing system, said digital data processing system comprising a plurality of units each comprising a plurality of said components, said expert system comprising an operating system means for storing in an error log a plurality of error entries, each error entry containing a plurality of differing indicia identifying components of differing types associated with a single error event in said digital data processing system, a monitor module means for monitoring said error entries to determine whether the number of error entries associated with a particular unit exceeds a threshold, generating a fault entry for each unit having error entries that exceed said threshold, each said fault entry identifying a unit and identifying said error entries associated with said unit, and inserting said fault entries into a fault queue, a collector module means for retrieving a fault entry from said fault queue, retrieving, from said error log, stored error entries associated with a unit identified in said fault entry, and inserting said error entries into an error log subset, an analyzer module means for analyzing said plurality of differing indicia contained within said error entries in said error log subset, by determining whether there is a substantially random distribution of indicia with respect to a plurality of components of a given type or a concentration of indicia with respect to one or more components of a given type as at least one step in identifying a pattern of indicia identifying components of differing types that corresponds with one of a plurality of failure theories, said analyzer module means storing said failure theory in a theory file, a notification module means for querying said theory file, and, based on a failure theory in said theory file, notifying a user of likely failure of said component, and a recovery module means for querying said theory file, and, based on a failure theory in said theory file, initiating recovery operations, to avoid data loss, said operating system means, said monitor module means, said collector module means, said analyzer module means, said notification module means, and said recover module means being adapted for implementation by a digital data processing system.

36. An expert system in accordance with claim 18, wherein said digital data processing system that implements said collector module means and said analyzer module means is said digital data processing system in which said expert system detects likely failures.

37. An expert system in accordance with claim 35, wherein said digital data processing system that implements said operating system means, said monitor module means, said collector module means, said analyzer module means, said notification module means, and said recovery module means is said digital data processing system in which said expert system detects likely failures.

38. A method of detecting one of a plurally of likely failures of components in a digital data processing system, said digital data processing system comprising a plurality of units each comprising a plurality of said components, comprising the steps of storing a plurality of error entries, each error entry containing a plurality of differing indicia identifying components of differing types associated with a single error event in said digital data processing system, monitoring said stored error entries to determine whether the number of stored error entries associated with a particular unit exceeds a threshold, collecting said stored error entries associated with said particular unit if said number of said stored entries associated with said particular unit exceeds said threshold, analyzing, through use of a digital expert system, said plurality of differing indicia contained within said collected error entries associated with said particular unit, by determining whether there is a substantially random distribution of indicia with respect to a plurality of components of a given type or a concentration of indica with respect to one or more components of a given type as at least one step in identifying a pattern of indicia identifying component of differing types that corresponds with one of a plurality of failure theories, and, based on said failure theory, identifying a said likely failure of a said component.

39. A method in accordance with claim 38, wherein said step of monitoring error entries associated with a particular unit comprises generating a fault entry for each unit having error entries that exceed said threshold, and inserting said fault entries into a fault queue.

40. A method in accordance with claim 39, wherein each said fault entry identifies a unit and identifies error entries associated with said unit.

41. A method in accordance with claim 40, wherein said step of collecting said error entries associated with said particular unit comprises retrieving a fault entry from said fault queue, retrieving, from an error log, said error entries associated with said unit identified in said fault entry, and inserting said error entries into an error log subset.

42. A method of detecting one of a plurality of likely failures of components in a digital data processing system, comprising the steps of storing a plurality of error entries identifying characteristics of differing types of error events in said digital data processing system, storing a plurality of error entries, each error entry containing a plurality of differing indicia identifying components of differing types associated with a single error event in said digital data processing system, analyzing, through use of a digital expert system, said plurality of differing indicia contained within said error entries, by determining whether there is a substantially random distribution of indicia with respect to a plurality of components of a given type or a concentration of indica with respect to one or more components of a given type as at least one step in identifying a pattern of indicia identifying components of differing types that corresponds with one of a plurality of failure theories, said step of analyzing said error entries comprising the steps of determining whether a sufficient number of error entries that identify communications errors have been stored to justify generating a fault theory entry indicating a likely communications failure, if said sufficient number of error entries that identify communications errors have been stored, comparing at least one number representing occurrences of said error entries that identify communications errors with at least one number representing occurrences of error entries that identify non-media drive-detected errors, and determining whether a ratio of said number representing occurrences of error entries that identify communications errors to said number representing occurrences of error entries that identify non-media drive-detected errors is sufficient to justify generating a fault theory indicating a likely communications failure, and, based on said failure theory, identifying a said likely failure of a said component.

43. A method of detecting one of a plurality of likely failures of components in a digital data processing system, comprising the steps of storing a plurality of error entries, each error entry containing a plurality of differing indicia identifying components of differing types associated with a single error event in said digital data processing system, analyzing, through use of a digital expert system, said plurality of differing indicia contained within said error entries, by determining whether there is a substantially random distribution of indicia with respect to a plurality of components of a given type or a concentration of indica with respect to one or more components of a given type as at least one step in identifying a pattern of indicia identifying components of differing types that corresponds with one of a plurality of failure theories, said step of analyzing said error entries comprising the steps of determining whether a sufficient number of error entries that identify non-media drive-detected errors have been stored to justify generating a fault theory entry indicating a likely drive-detected non-media failure, if said sufficient number of said error entries that identify non-media drive-detected errors have been stored, and if most of said error entries that identify non-media drive-detected errors identify a common error type, generating a fault theory entry indicating a likelihood of said common error type, and if said sufficient number of said error entries that identify non-media drive-detected errors have been stored, and if most of said error entries that identify non-media drive-detected errors do no identify a common error type, generating fault theory entries identifying error types most frequently identified by said error entries that identify non-media drive-detected errors, and, based on said failure theory, identifying a said likely failure of a said component.

44. A method of detecting one of a plurality of likely failures of components in a digital data processing system, comprising the steps of storing a plurality of error entries, each error entry containing a plurality of differing indicia identifying components of differing types associated with a single error event in said digital data processing system, analyzing, through use of a digital expert system, said plurality of differing indicia contained within said error entries, by determining whether there is a substantially random distribution of indicia with respect to a plurality of components of a given type or a concentration of indica with respect to one or more components of a given type as at least one step in identifying a pattern of indicia identifying components of differing types that corresponds with one of a plurality of failure theories, said step of analyzing said error entries comprising the steps of performing analysis in connection with head matrix failure, if no head matrix failure is likely, performing analysis in connection with bad surfaces, if there are no likely bad surfaces, performing analysis in connection with head slaps, if no head slap failure is likely, performing analysis in connection with errors directed to a servo system, if no servo system failure is likely, performing analysis in connection with read path failure, if no read path failure is likely, performing analysis in connection with bad heads on opposing media surfaces, if there are no likely bad heads on opposing media surfaces, performing analysis in connection with radial scratches, and, if there are no likely radial scratches, performing analysis in connection with bad heads, and, based on said failure theory, identifying a said likely failure of a said component.

45. An expert system for detecting one of a plurality of likely failures of components in a digital data processing system, said digital data processing system comprising a plurality of units each comprising a plurality of said components, comprising a monitor module means for monitoring a plurality of stored error entries, each error entry containing a plurality of differing indicia identifying components of differing types associated with a single error event in said digital data processing system, to determine whether the number of error entries associated with a particular unit exceeds a threshold, a collector module means for collecting said error entries associated with said particular unit, and an analyzer module means for analyzing said plurality of differing indicia contained within said collected error entries, by determining whether there is a substantially random distribution of indicia with respect to a plurality of components of a given type or a concentration of indicia with respect to one or more components of a given type as at least one step in identifying a pattern of indicia identifying components of differing types that corresponds with one of a plurality of failure theories, said analyzer module means identifying a said likely failure of a said component based on said failure theory, said monitor module means, said collector module means and said analyzer module means being adapted for implementation by a digital data processing system.

46. An expert system in accordance with claim 45, wherein said monitor module means generates a fault entry for each unit having error entries that exceed said threshold, and inserts said fault entries into a fault queue.

47. An expert system in accordance with claim 46, wherein each said fault entry identifies a unit and identifies error entries associated with said unit.

48. An expert system in accordance with claim 47, wherein said collector module means retrieves a fault entry from said fault queue, retrieves, from an error log, said stored error entries associated with said unit identified in said fault entry, and inserts said error entries into an error log subset.

49. An expert system for detecting one of a plurality of likely failures of components in a digital data processing system, comprising a collector module means for collecting a plurality of stored error entries, each error entry containing a plurality of differing indicia identifying components of differing types associated with a single error event in said digital data processing system, and an analyzer module means for analyzing said plurality of differing indicia contained within said collected error entries, by determining whether there is a substantially random distribution of indicia with respect to a plurality of components of a given type or a concentration of indicia with respect to one or more components of a given type as at least one step in identifying a pattern of indicia identifying components of differing types that corresponds with one of a plurality of failure theories, said analyzer module means identifying a said likely failure of a said component based on said failure theory, said analyzer module means determining whether a sufficient number of error entries that identify communications errors have been stored to justify generating a fault theory entry indicating a likely communications failure, and if said sufficient number of error entries that identify communications errors have been stored, said analyzer module means comparing at least one number representing occurrences of said error entries that identify communications errors with at least one number representing occurrences of error entries that identify non-media drive-detected errors, and said analyzer module means determining whether a ratio of said number representing occurrences of error entries that identify communications errors to said number representing occurrences of error entries that identify non-media drive-detected errors is sufficient to justify generating a fault theory indicating a likely communications failure, said collector module means and said analyzer module means being adapted for implementation by a digital data processing system.

50. An expert system for detecting one of a plurality of likely failures of components in a digital data processing system, comprising a collector module means for collecting a plurality of stored error entries, each error entry containing a plurality of differing indicia identifying components of differing types associated with a single error event in said digital data processing system, and an analyzer module means for analyzing said plurality of differing indicia contained within said collected error entries, by determining whether there is a substantially random distribution of indicia with respect to a plurality of components of a given type or a concentration of indicia with respect to one or more components of a given type as at least one step in identifying a pattern of indicia identifying components of differing types that corresponds with one of a plurality of failure theories, said analyzer module means identifying a said likely failure of a said component based on said failure theory, said analyzer module means determining whether a sufficient number of error entries that identify non-media drive-detected errors have been stored to justify generating a fault theory entry indicating a likely drive-detected non-media failure, if said sufficient number of said error entries that identify non-media drive-detected errors have been stored, and if most of said error entries that identify non-media drive-detected errors identify a common error type, said analyzer module means generating a fault theory entry indicating a likelihood of said common error type, and if said sufficient number of said error entries that identify non-media drive-detected errors have been stored, and if most of said error entries that identify non-media drive-detected errors do no identify a common error type, said analyzer module means generating fault theory entries identifying error types most frequently identified by said error entries that identify non-media drive-detected errors, said collector module means and said analyzer module means being adapted for implementation by a digital data processing system.

51. An expert system for detecting one of a plurality of likely failures of components in a digital data processing system, comprising.

a collector module means for collecting a plurality of stored error entries, each error entry containing a plurality of differing indicia identifying components of differing types associated with a single error event in said digital data processing system, and an analyzer module means for analyzing said plurality of differing indicia contained within said collected error entries, by determining whether there is a substantially random distribution of indicia with respect to a plurality of components of a given type or a concentration of indicia with respect to one or more components of a given type as at least one step in identifying a pattern of indicia identifying components of differing types that corresponds with one of a plurality of failure theories, said analyzer module means identifying a said likely failure of a said component based on said failure theory, said analyzer module means performing analysis in connection with head matrix failure, if no head matrix failure is likely, said analyzer module means performing analysis in connection with bad surfaces, if there are no likely bad surfaces, said analyzer module means performing analysis in connection with head slaps, if no head slap failure is likely, said analyzer module means performing analysis in connection with errors directed to a servo system, if no servo system failure is likely, said analyzer module means performing analysis in connection with read path failure, if no read path failure is likely, said analyzer module means performing analysis in connection with bad heads on opposing media surfaces, if there are no likely bad heads on opposing media surfaces, said analyzer module means performing analysis in connection with radial scratches, and if there are no likely radial scratches, said analyzer module means performing analysis in connection with bad heads said collector module means and said analyzer module means being adapted for implementation by a digital data processing system.

* * * * *